Figure 1:
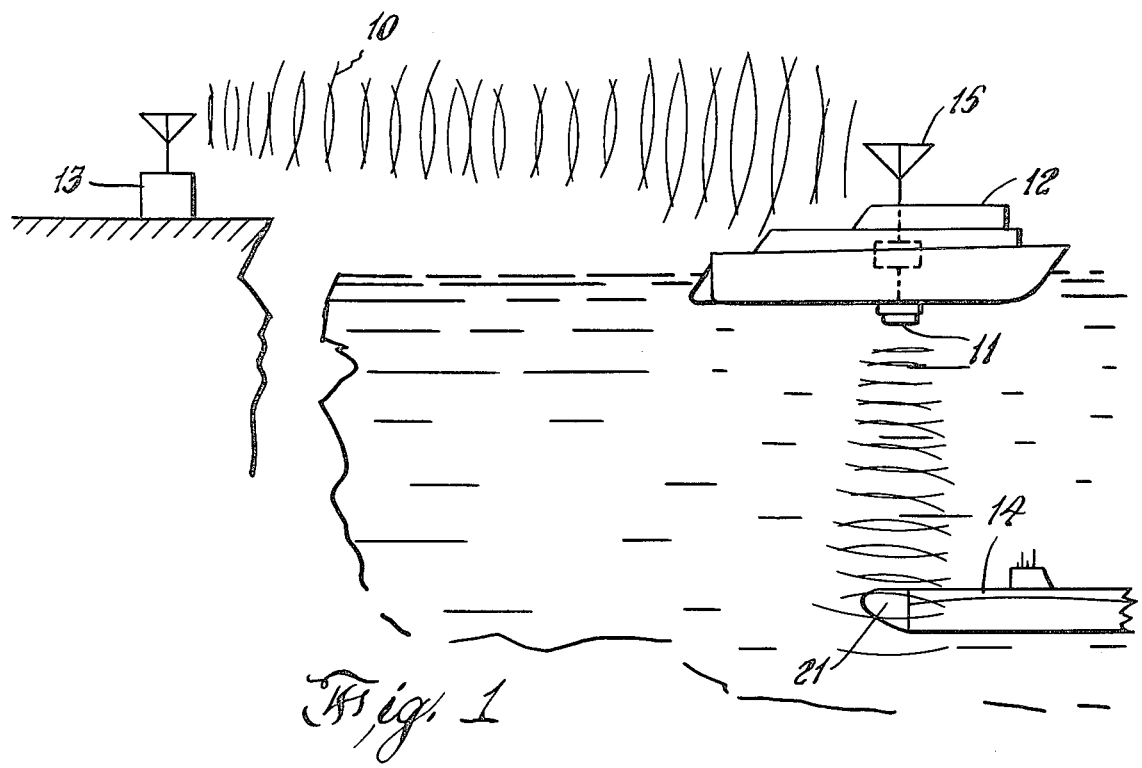

United States Patent [19]
Doherty

[11] 4,203,160
[45] May 13, 1980

[54] SUBMARINE COMMUNICATION

[75] Inventor: John J. Doherty, Fairfax, Va.

[73] Assignee: The United States of America as represented by the Secretary of the Navy, Washington, D.C.

[21] Appl. No.: 79,931

[22] Filed: Dec. 30, 1960

[51] Int. Cl.$^2$ .............................................. H04B 1/59
[52] U.S. Cl. ........................................ 367/2; 367/6; 367/132; 367/134
[58] Field of Search ....................... 340/2, 4, 5, 6, 177, 340/189, 209, 211, 5 T, 3, 5 R; 343/225–228; 325/1–15

[56] References Cited
U.S. PATENT DOCUMENTS

| | | | |
|---|---|---|---|
| 1,320,610 | 11/1919 | Elia ........................................... | 340/2 |
| 1,425,522 | 8/1922 | Hammond, Jr. .......................... | 340/2 |
| 2,164,858 | 7/1939 | West ....................................... | 340/12 |
| 2,395,679 | 5/1942 | Neuhof ................................... | 340/2 |
| 2,431,018 | 11/1947 | Bailey et al. ............................ | 340/2 |
| 2,838,741 | 6/1958 | Mason ..................................... | 340/2 |
| 3,092,803 | 6/1963 | Wolff et al. .............................. | 340/3 |

FOREIGN PATENT DOCUMENTS

| | | | |
|---|---|---|---|
| 596439 | 5/1934 | Fed. Rep. of Germany .............. | 340/2 |
| 1020463 | 12/1957 | Fed. Rep. of Germany .............. | 340/2 |

OTHER PUBLICATIONS

Kiernan, *Electronics*, Oct. 1947, pp. 96–98.
Miller, *IRE Trans. on Comm. Systems*, vol. CS-7, No. 4, Dec. 1959, pp. 249–251.
Isaak, *The Journal of the Acoustical Soc. of Amer.*, vol. 28, No. 4, Jul. 1956, pp. 556;557.

*Primary Examiner*—Richard A. Farley
*Attorney, Agent, or Firm*—Richard S. Sciascia; Arthur A. McGill; Prithvi C. Lall

EXEMPLARY CLAIM

2. A method by which a submarine while deeply submerged in the sea may receive a message from a remote station without disclosing to others the position of the submarine, which comprises transmitting from said remote station into the atmosphere message information modulated on electromagnetic radiant energy, intercepting said radiant energy at a plurality of separated and widely dispersed relay stations on the surface of the sea, extracting the message information from the electromagnetic energy and transmitting acoustic wave energy modulated by said message information from each of said relay stations into the sea, locating said submerged submarine in message receiving range of one of said relay stations and detecting the acoustic wave energy modulated by the message information aboard said submarine.

3 Claims, 6 Drawing Figures

SUBMARINE COMMUNICATION

The invention described herein may be manufactured and used by or for the Government of the United States of America for governmental purposes without the payment of any royalties thereon or therefor.

This invention relates to communication wherein one of the communicant stations is a deeply submerged submarine.

Modern nuclear submarines are capable of remaining submerged at a selected station for weeks and even months, and alternatively are capable of navigating a prearranged course for comparable periods of time. During a lengthy tour of duty, it is preferable that the submarine remain undetected so that the number, distribution, and locations of submarines of an undersea fleet may remain unknown to all except the plan formulators at fleet command headquarters. Under these conditions, the effectiveness of the submarine fleet as a deterrent and as a second strike capability are maintained at a maximum. Notwithstanding the stealth requirement there must be provision for communication between any of the submarines and command headquarters at intervals during each submarine's tour of duty. If each submarine surfaced to send and/or receive messages at frequent intervals, the possibility of each submarine's detection is multiplied several fold. If a number of submarines of the fleet are detected and their positions plotted at a given time, this information may be useful in reducing the deterrent effectiveness of the submarine fleet.

If a submarine is unable to avoid disclosing its approximate position during communication intervals, it is preferable that the approximation of the submarine's position that may be obtained during a communication interval be as inexact as possible. Not only is this important for minimizing the reliability of charts of the submarine fleet distribution by unfriendly powers but also to afford each submarine greater safety during an emergency.

An object of this invention is to establish communication between a deeply submerged submarine and another communicant such as a plane or a ship or a remote land site. Communication under this object may include one way communication from the deeply submerged submarine to the other communicant, or one way communication from the other communicant to the submarine, or two way communication between the submarine and the other communicant.

A further object is to provide an improved method whereby communication between command headquarters and a submerged submarine may be established with a minimum possibility of detection of the submarine by an unfriendly power and wherein the method is relatively simple, practical, effective, and inexpensive.

Figure 2:
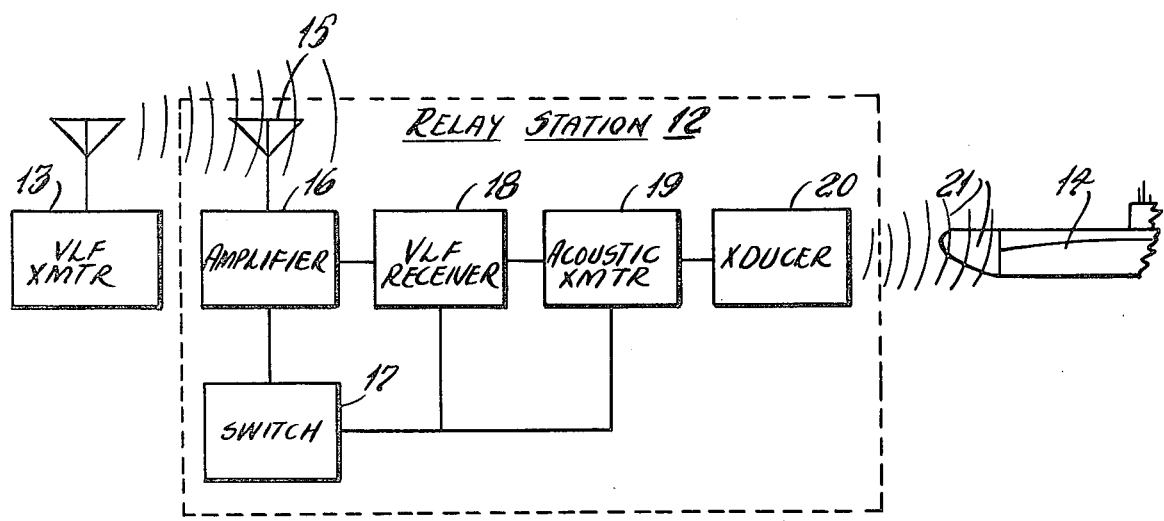
Figure 3:
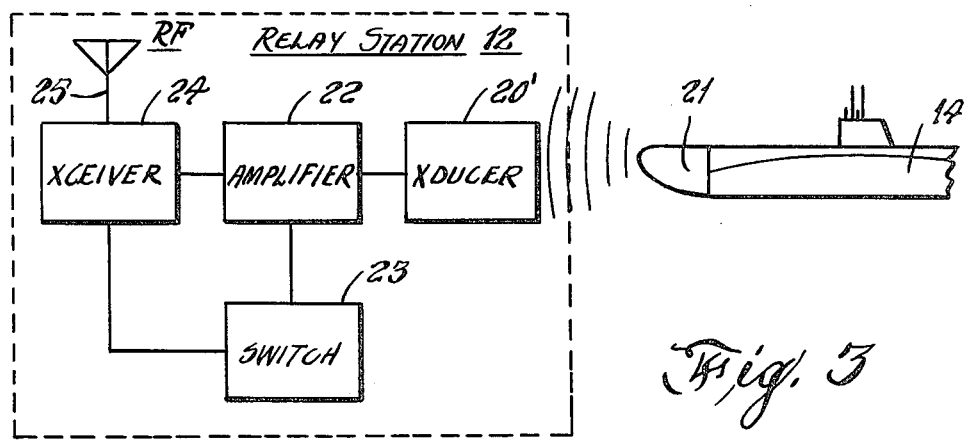
Figure 4:
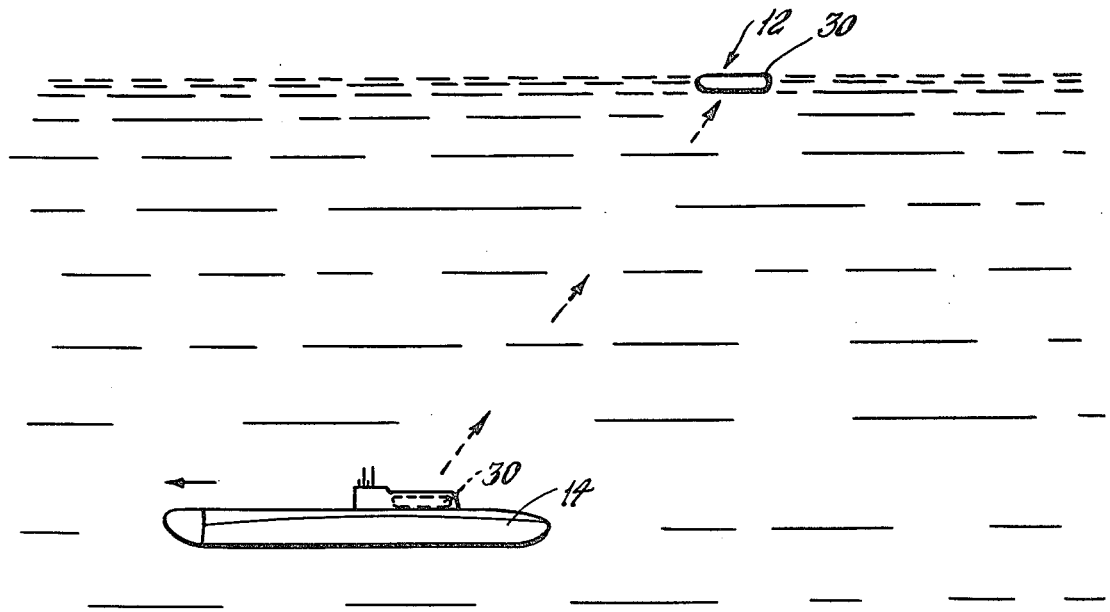
Figure 5:
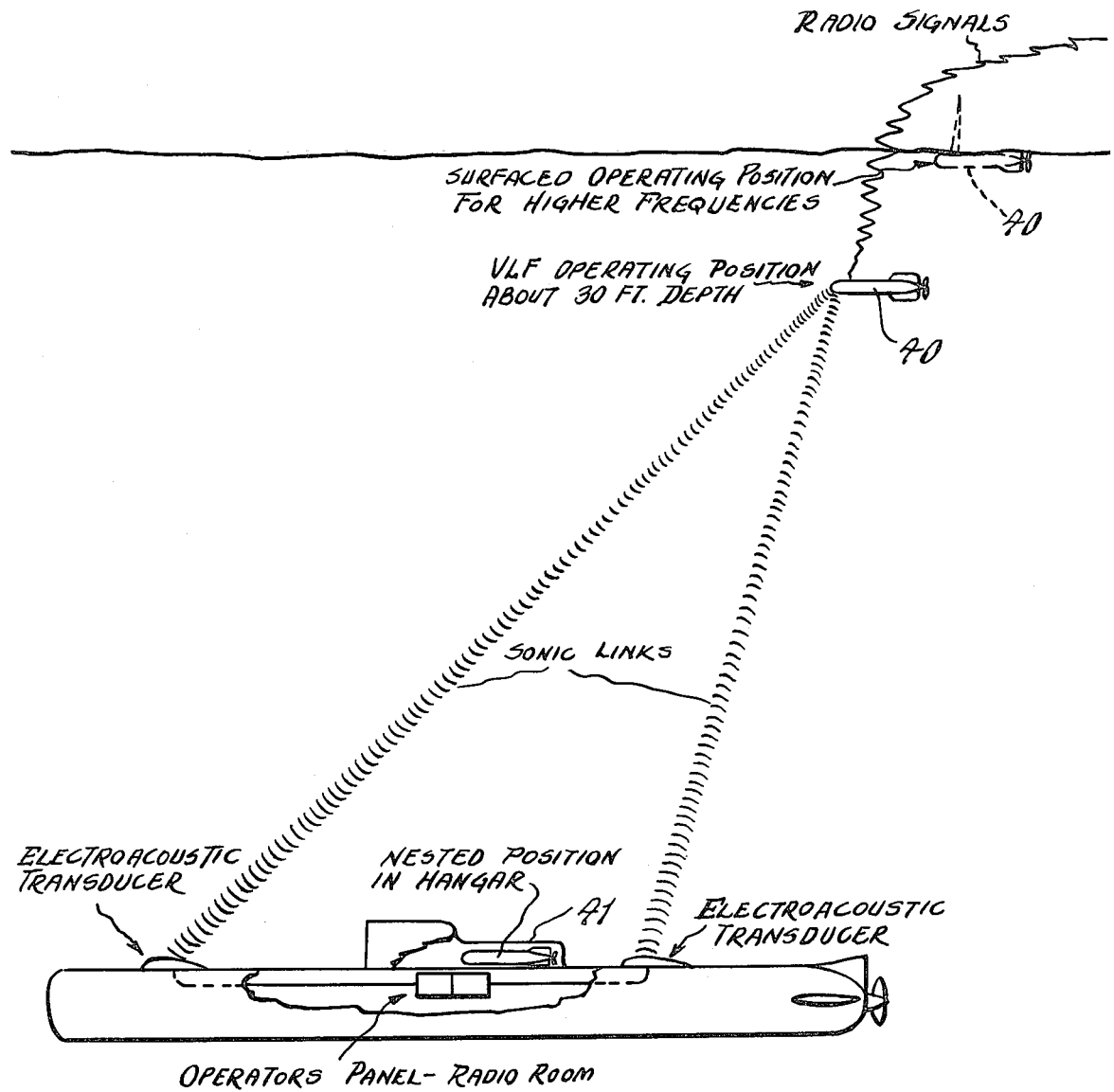
Figure 6:
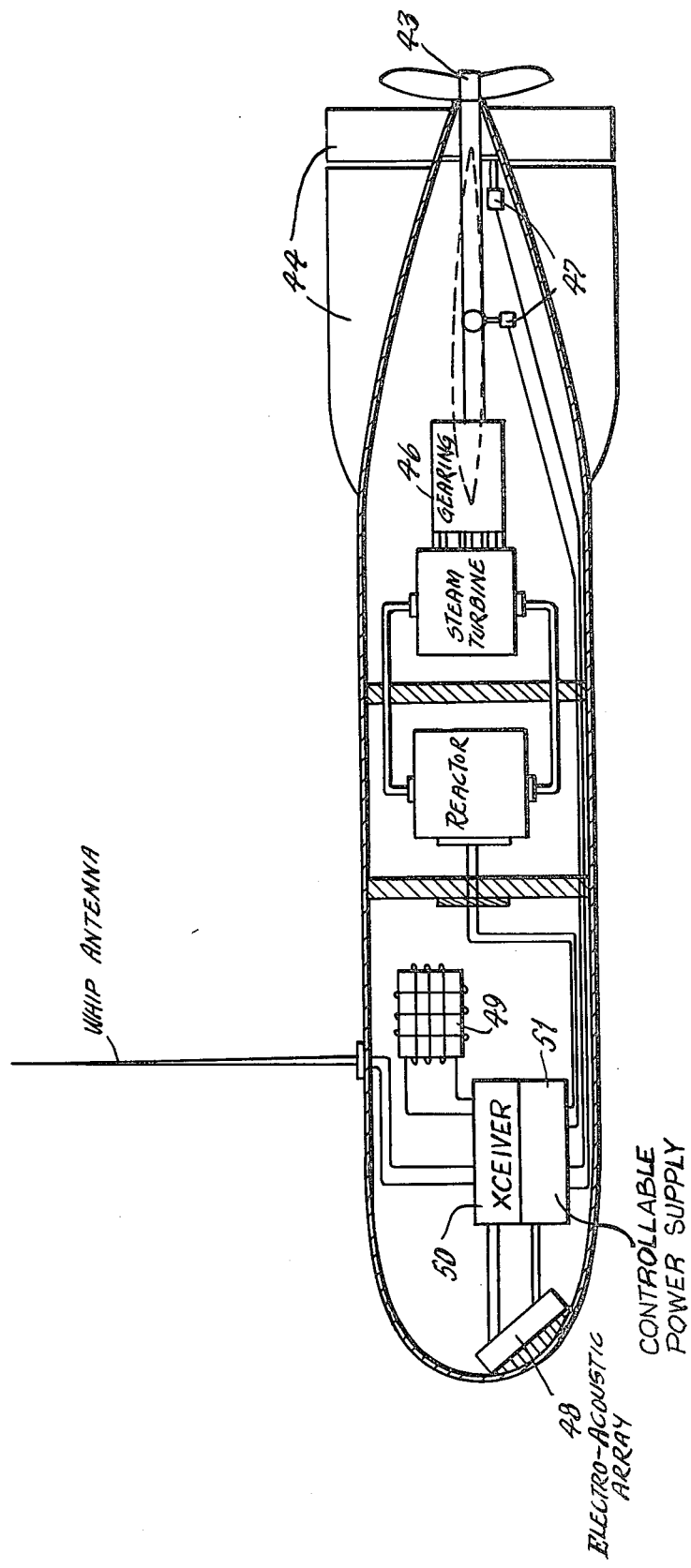

Other objects and many of the attendant advantages of this invention will be readily appreciated as the same becomes better understood by reference to the following detailed description when considered in connection with the accompanying drawings wherein:

FIG. 1 is a diagram illustrating message transfer between a land station and a submerged submarine via surface ship operating as a relay station, FIG. 2 illustrates a block diagram of the equipment on the relay station of FIG. 1 for automatically relaying messages from the atmosphere to the water, FIG. 3 illustrates a block diagram of the equipment on the relay station of FIG. 1 for automatically relaying messages from beneath the surface of the sea to the atmosphere, FIGS. 4 and 5 illustrate a buoy and drone respectively as a communication relay station for a deeply submerged submarine, and FIG. 6 illustrates a drone for use in this invention.

This invention, as illustrated in its broader aspect in FIG. 1, contemplates the combination of an electromagnetic energy link 10 through the atmosphere and an acoustic wave energy link 11 through seawater joined in tandem by a relay station 12 at the interface of sea and atmosphere. A very low frequency (VLF) high power land station 13 of the type recently constructed by the U.S. Navy, taken as illustrative of a station for communicating with submarines, radiates electromagnetic wave energy into the atmosphere modulated with the message information; the signal energy may be intercepted substantially anywhere throughout the world on VLF receivers. The signal is relayed by station 12, e.g., a surface vessel, to submarine 14 in the vicinity. The relay station 12 is equipped as shown in FIG. 2 with a VLF antenna 15 coupled to a frequency selective input amplifier 16. A pulse responsive switch 17 connected to the output of amplifier 16 is provided for automatically turning on both VLF receiver 18 connected to the output of amplifier 16, and transmitter 19 in response to a switching pulse train that is transmitted from station 13 sufficiently prior to the leading part of a message for the receiver 18 and transmitter 19 to be activated. An electroacoustic transducer 20 is connected to transmitter 19 for transferring to the seawater the power generated by the latter and modulated by the signal from VLF receiver 18. At the end of a message, another pulse train from transmitting station 13 operates the switch 17 to shut down the receiver 18 and transmitter 19. An operator may be substituted for switch 17 for flexibility but at the sacrifice of automatic operation. The acoustic wave energy from the relay station is intercepted by acoustic communication equipment 21 on submarine 14. Details of individual components shown in the block diagrams are omitted because the individual components are known and used by those skilled in the art and their specific details are not part of this invention.

In FIG. 3 there is shown apparatus disposed at the relay station 12 for enabling submarine 14 to send a message through its acoustic communication equipment 21 and through relay station 12. The apparatus includes an electroacoustic transducer 20' which may or may not be the transducer 20 shown in FIG. 2 and an amplifier 22 connected thereto. A pulse train responsive switch 23 corresponding functionally to switch 17 in FIG. 2 is operable to turn on and off transceiver equipment 24. The message is retransmitted by the relay station as modulated radio frequency energy (RF) or ultra high frequency energy (UHF), radiated by antenna 25. Because it cannot be ascertained from an RF transmission from a surface vessel that the message originated in a submarine, the submarine's position is not divulged.

Within the scope of the broad principles described above, this invention further contemplates that each surface naval vessel and any surface vessel under control of the naval authorities be outfitted with equipment as shown in FIGS. 2 and 3 whereby each such vessel can function as a relay station. The number of surface vessels is many times the number of submarines and are dispersed over the seas on their respective missions. The operations planners may include in the orders for each surface vessel that they be at predetermined locations at those preselected times when scheduled messages will be transmitted. Each of the submarines, operating under related orders will be in message receiving range of one of the surface vessels. If the surface vessel equipment is operated automatically and if all the surface vessels are under orders to be at specified locations during communication periods, none of the surface vessels will know which among them operated as a relay station at the time the message was sent from transmitter 13. In other words, even the surface vessels will not know the location of the submarines. To increase the security in this method of communication, dummy messages may be transmitted at intervals between real message transmissions. This will render it impossible for the surface vessels or an unfriendly power to ascertain from the positions of surface vessels during transmissions, the geographical distribution of the submarine fleet and the precise locations of individual submarines.

Each of the surface vessels may be further equipped with acoustically operable identification friend or foe (IFF) equipment to enable the submarine 14 to identify a surface vessel 12 in its vicinity before attempting to send a message through the surface vessel. The interrogation pulse from the submarine is brief and there is substantially no likelihood of the submarine's detection if the surface vessel is equipped as a relay station as in FIGS. 2 and 3. Alternatively, the message may be time-compressed and delivered in a short burst so that the likelihood of the submarines being detected is minimized even if the surface vessel is not equipped as a relay station 12.

Each of the relay stations may be equipped additionally with a repeater responsive to signals transmitted by transceiver 24 to ensure that any message passing through the relay equipment will go around the world.

While the above described method of communication is satisfactory for regularly scheduled transmissions, there may be circumstances when a submarine may find it necessary to transmit a message while remote from any relay station 12. For this purpose each submarine is equipped to receive and transmit messages directly and may surface to use its equipment. However, this reduces the security and safety of the submarine especially during an emergency. Therefore, within the broad principles of this invention, the submarine also is equipped with a buoy 30, FIG. 4, releasable at will from the submarine. The buoy is equipped as a battery operated relay station 12 minus switches 17 and 23, the communication equipment therein being energized prior to release by the submarine. The buoy may be designed for discharge through a torpedo tube or from a hangar on deck and to have comparatively little positive buoyancy whereby when released, it has a low rate of rise toward the surface. By releasing the buoy for a slow rate of rise while under way and at a preselected depth, the submarine is at a substantial distance from the buoy when the buoy surfaces. The buoy is equipped with a conventional self destruct or self flooding mechanism operable after a time delay adequate for completion of communication.

The buoy may be equipped with motor-driven propulsion and steering means as taught by U.S. Pat. No. 2,941,492 and an acoustically controllable battery power supply for the motors whereby it can function as a drone or satellite of the submarine.

There is shown in FIG. 5 a drone or satellite 40 for the submarine whereby the latter can establish communication with a plane, ship, or land station not only from a substantial depth but also while continuing underway at substantial speed. The submarine is provided with a hangar 41 for nesting the drone 40 until used and if recovered after use, until used again. There is shown in FIG. 6 the major components of the drone. The hull of the drone is shaped similar to that of a torpedo and may be of metal, fiber glass laminate or other. The drone includes a propeller and shaft 43, vertical and horizontal fins and rudders 44, propulsion means including a power plant 45 and mechanical drive linkage 46 between the power plant and the propeller. The power plant shown on the drawing is a miniature steam nuclear reactor plant e.g., the type utilizing the byproducts of nuclear fission (isotopes) as the prime heating agent generating steam to drive the turbine which imparts rotation to the propeller shaft. Other types of power plants such as diesel, rocket, hydrogen peroxide, and battery may be used but none have the endurance of a nuclear reactor plant. The choice of type of power plant depends on factors such as cost, endurance, weight, peak power, ease of control and the like. Electrically operable actuators 47 are connected to the vertical and horizontal stabilizers and the rudder. An electroacoustic transducer array 48, an omnidirectional crossed-loop VLF antenna 49, a whip antenna for MF, HF, UHF and IFF are provided for sensing and transmitting. A transceiver 50 receives, amplifies converts and couples a message signal from the antennas to the electroacoustic array and vice versa. Drone control signals from the submarine are detected by the transducer 48, then coupled to an electrical power supply and pulse responsive control mechanism 51 therefor. Electrical connectors link the controllable power supply 51 with controllable elements in the reactor and the actuators 47 for the vertical and horizontal stabilizers and the rudder. The drone's position is monitored by the submarine's sonar equipment and controlled by command pulses to the drone for controlling the power plant 46 or the direction control element 44. While the drone is at shallow depth below the water surface, the crossed-loop antenna is able to intercept VLF signals propagated through the air and penetrating the surface of the water for about thirty feet to the drone. These signals received via VLF are amplified to the proper level by preamplifiers converted in frequency to the desired sonic frequency in the circuit 50 and transmitted by the transducer array 48 as acoustic wave energy, propagated through the water and detected by the submarine. Outgoing messages from the submarine through the drone are radiated by the whip antenna with the drone at the surface as described previously.

The drone has additional utility as a decoy, and an underwater sonic ranging and detection device, and as a surface and subsurface optical device for relaying back picture information when equipped with a television system or infrared detector. Several drones can be controlled by a single surface of subsurface vessel enabling wider surveillance by a single vessel.

U.S. Pat. Nos. 1,664,549 and 1,659,653 disclose examples of remote control mechanisms for control of drones by compressional waves that may be used in this invention.

Obviously many modifications and variations of the present invention are possible in the light of the above teachings. It is therefore to be understood that within the scope of the appended claims the invention may be practiced otherwise than as specifically described.

I claim:

1. A method of communication between a remote site and a deeply submerged submarine comprising transmitting message intelligence on acoustic wave carrier energy of predetermined character between the submerged submarine and a position substantially at the surface of the sea in the vicinity of the submarine, transmitting message intelligence on electromagnetic wave energy for predetermined character between the remote site and the position in the vicinity of the submarine, intercepting at said position any intelligence carried by said acoustic wave energy originating at said submarine and passing through the water and intercepting at said position any message intelligence carried by electromagnetic wave energy of predetermined character and originating at said remote site and passing through the atmosphere, and transferring message intelligence intercepted from one of said carriers and retransmitting from said position said message intelligence on the other of said carriers, whereby said message intelligence may be delivered between said deeply submerged submarine and said remote site with maximum security to said submarine.

2. A method by which a submarine while deeply submerged in the sea may receive a message from a remote station without disclosing to others the position of the submarine, which comprises transmitting from said remote station into the atmosphere message information modulated on electromagnetic radiant energy, intercepting said radiant energy at a plurality of separated and widely dispersed relay stations on the surface of the sea, extracting the message information from the electromagnetic energy and transmitting acoustic wave energy modulated by said message information from each of said relay stations into the sea, locating said submerged submarine in message receiving range of one of said relay stations and detecting the acoustic wave energy modulated by the message information aboard said submarine.

3. A method by which a submarine while deeply submerged in the sea may communicate with a remote station without disclosing to unfriendly countries the position of the submarine comprising locating at a selected time a plurality of message relaying surface ships at a plurality of separated and widely dispersed sites on the surface of the sea, locating the submarine in acoustic wave energy reception range of one of said surface ships, transmitting and receiving message information at said remote site in the form of modulated electromagnetic energy, transmitting and receiving message information at said submarine in the form of modulated acoustic wave energy, retransmitting at each of said ships any incident electromagnetic wave energy from said remote station and any incident acoustic wave energy from said submarine on the other of the two forms of message carrying energy.

* * * * *